United States Patent [19]

Miki et al.

[11] Patent Number: 4,838,517
[45] Date of Patent: Jun. 13, 1989

[54] PRESSURE CONTROL VALVE

[75] Inventors: Nobuaki Miki, Kariya; Akira Suzuki, Obu; Kouji Kobayashi, Toyota, all of Japan

[73] Assignee: Aisin Aw Co., Ltd., Anjo, Japan

[21] Appl. No.: 198,432

[22] Filed: May 25, 1988

[30] Foreign Application Priority Data

May 28, 1987 [JP] Japan ................ 62-133592

[51] Int. Cl.$^4$ ........................... F15B 13/044
[52] U.S. Cl. ............. 251/129.16; 137/625.65; 251/129.17
[58] Field of Search ........... 137/625.65; 251/129.15, 251/129.16, 129.17; 335/262

[56] References Cited

U.S. PATENT DOCUMENTS 2,858,487 10/1958 Immel .................. 335/262 X
4,535,816 8/1985 Feder et al.
4,635,683 1/1987 Nielsen ................ 251/129.15 X Primary Examiner—Gerald A. Michalsky
Attorney, Agent, or Firm—Frank J. Jordan; C. Bruce Hamburg; Manabu Kanesaka

[57] ABSTRACT

A pressure control valve includes pressure modulating section and a magnetic section. The magnetic section has a cylindrical case, a coil assembly, a cylindrical core, a rod and a plunger. Outer limbs of a disc type supporting members which are made of a leaf spring member are fixed to both ends of the cylindrical core, and both ends of the rod are suspended at the center of the disc type supporting members, so that the rod is supported by the disc type supporting members. Due to the above when operation, the move of the rod is performed smoothly by the supporting structure of the disc type supporting member, and the supporting member moves according to the move of the rod, so that such move of the rod brings about no volume change in the magnetic section.

4 Claims, 2 Drawing Sheets

FIG. 2
FIG. 3
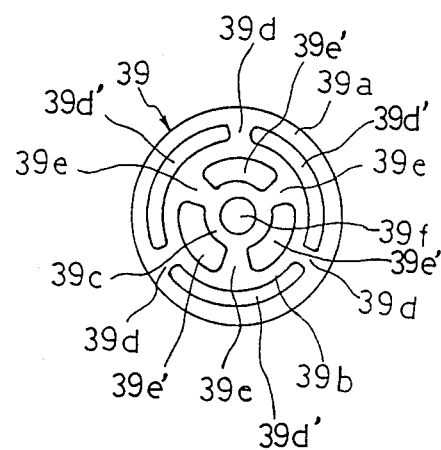
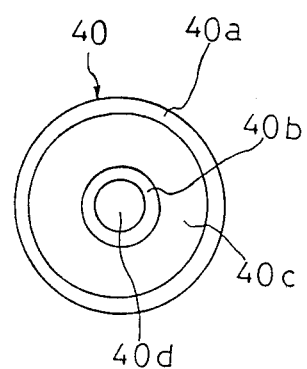

PRESSURE CONTROL VALVE

BACKGROUND OF THE INVENTION

1. Field of the Invention

The present invention relates to a pressure control valve, particularly to a solenoid pressure control valve controlling fluid pressure corresponding to electric level. Typical types of solenoid pressure control valve are a diaphragm type receiving a feedback pressure on the diaphragm, and a spool type receiving the feedback pressure on a spool end. The present invention relates to both types of pressure control valve, particularly to the structure of magnetic section.

2. Description of the Prior Art

A pressure control valve, as shown in the United States Pat. No. 4,535,816, has a pressure modulating section, and a magnetic section having a coil assembly, a core and a rod being placed coaxially with, and pressed by a spring toward the modulating section. And a spring is attached to a plunger. The above elements are installed concentrically from outside to the center, and the magnetic section has a sealed structure. One end of the rod is supported by a leaf spring held between the case and the pressure modulating section, and the leaf spring has a through hole in the center. Another end of the rod is supported to slide in a bush which is screwed to the core.

In the above stated pressure control valve, though entering of foreign materials into the magnetic section is prevented due to the sealed structure of the magnetic section, when the movable section having the plunger and the rod moves by electrical signals no room is available for volume change. This causes worse response of the magnetic section, and precision of pressure modulation becomes worse because of pressure change or temperature change caused by the above volume change in the magnetic section.

As another end of the rod is supported by sliding method, friction of sliding makes response and precision worse.

SUMMARY OF THE INVENTION

An objective of the present invention is to provide a pressure control valve including a magnetic section which has reliable response and good precision, and can prevent foreign materials from entering.

Accordingly, the present invention is explained as follows: a pressure control valve (1) includes the pressure modulating section (2) and the magnetic section (3). The magnetic section (3) has a cylindrical case (32), a coil assembly (35) which is installed concentrically in the case (32), a cylindrical core (33) which is installed concentrically in the coil assembly (35), a rod (36) which moves along by the center of the core (33), and a plunger (37) which is fixed on one end of the rod (36). Disc type supporting members (39, 39) made of leaf spring are fixed at their outer brims to the both ends of the case (32). The both ends of the rod (36) are suspended and supported by the center of the disc type supporting members (39, 39).

Based on the above structure, the pressure control valve (1) works corresponding to electric level input to the magnetic section (3), and output hydraulic pressure corresponding to the input electric level. During this pressure modulation, the rod (36) is moved to the point where the force developed from the magnetic section (3) and the force from the pressure modulating section (2) are balanced. The move of the rod (36) is performed quite smooth due to the supporting structure of the disc type supporting members (39, 39). Furthermore, the disc type supporting members (39, 39) move to the same direction as the rod (36), so that no volume change of the magnetic section (3) is developed, and foreign materials are prevented from entering into the magnetic section (3) because no pressure change is developed in the magnetic section (3).

In addition to the above, through holes are made in the supporting members (39, 39), and disc type filter members (40, 40) are overlaid with the supporting members (39, 39), so that if pressure changes in the magnetic section (3) due to temperature change, such pressure is released from the through holes (39d'), (39e') of the disc type supporting members (39, 39) and the disc type filter members (40, 40), so nothing affects the pressure modulating section.

BRIEF DESCRIPTION OF THE DRAWINGS

FIG. 2 is a front view of a disc type supporting member used in a magnetic section; and FIG. 3 is a front view of a disc type filter member used in a magnetic section.

DETAILED DESCRIPTION OF THE PREFERRED EMBODIMENTS

Figure 1:
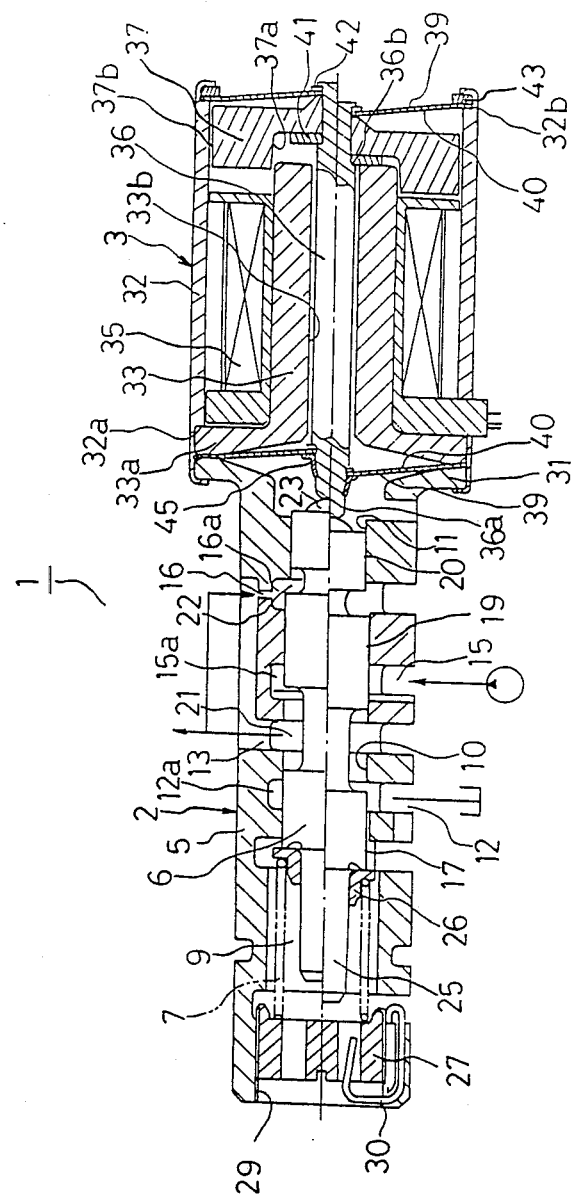
FIG. 1 is a cross sectional view of a pressure control valve of the invention.

The embodiments of the present invention are explained along by the drawings.

A pressure control valve 1, shown in FIG. 1, includes a pressure modulating section 2 and a magnetic section 3.

The pressure modulating section has a valve sleeve 5 and a spool 6. The valve sleeve 5 has a large hole 9, a middle hole 10 and a small hole 11. The large hole 9 contains a spring 7 in axial direction and the middle hole 10 contains the spool 6. On the circumference of the valve sleeve 5 along by the middle hole 10, a drain port 12, an output port 13 and an application port 15 are laid in this sequence. On the border of the holes 10 and 11 of the valve sleeve 5, a feedback port 16 having a throttle passage is provided. And to make fluid flow smooth at each port, ringed dents 12a, 15a and 16a are provided. The spool 6 has the lands 17 and 19 having same diameters, and the land 20 which has small diameter and is close to the land 19. The lands 17 and 19 are movable in the middle hole 10 and the land 20 is movable in the small hole 11. The space between the lands 17 and 19 is so set that the output port 13 is connected to both the application port 15 and drain port 12 according to certain ratio of openings made by the spool 6. A space 21 between the lands 17 and 19 is always connected to the output port 13 without changing opening ratio. On the other hand, a space 22 surrounded by the lands 19, and the holes 10 and 11 is always connected to the feedback port 16. In FIG. 1, a half-ball type extrusion 23 at the center of the land 20 is a contact point to the rod 36. A bar member 25 extended from the center of the land 17 is a guide member for the spring 7 and a stroke limiter for the spool 6.

The assembly of pressure modulating section 2 is that; from one end of the hole 9 the spool 6 attaching a washer 26 on the bar member 25 is inserted; a male thread member 27 screws a female thread member 29 of the valve sleeve 5 so that compression is provided to the spring 7 at the same time the spring 7 is held by the washer 26; the male thread member 27 is fixed to the valve sleeve 5 by a pin 30. After the assembly of the pressure modulating section 2, this section 2 is coupled with the magnetic section 3 by caulking a brim of a case 32 to a flange 31.

The magnetic section 3 has a static section and a movable section. The static section has a cylindrical case 32 made of magnetic material, a thick cylindrical core 33 made of magnetic material, and a coil assembly 35. A flange 33a of the core 33 engages one end of the case 32, the core 33 is concentrically laid with the case 32, and the coil assembly 35 is supported in a space made by the case 32 and the core 33. The movable section has the rod 36, a plunger 37 made of magnetic material, a disc type supporting members 39, 39 and a disc type filter members 40, 40. The rod 36 is inserted in a hollow area 33b, and the plunger 37 is laid at an end of the rod 36 and is magnetically attracted by the coil assembly 35. The disc type supporting members 39, 39 made of thin leaf spring supports the rod 36 at both ends, and the disc type filter members 40, 40 are overlaid with the supporting members 39, 39. The plunger 37 is fixed on an end of the rod 36, and has thick cylindrical shape, and the center area toward the core 33 has a concave 37a so that the extrusion of the core 33 is inserted with minute space when the concave 37a is magnetically attracted. And circumference 37b faces an inner surface of the case 32 with a minute space. Each disc type supporting member 39, as shown in FIG. 2, has an outer ring 39a, middle ring 39b and an inner ring 39c. Furthermore, among them radial connecting parts 39d, 39d, 39d, connects the outer ring 39a and the middle ring 39b; and radial connecting parts 39e, 39e, 39e connect the middle ring 39b and the inner ring 39c. At the center of the inner ring 39c, a through hole 39f to pass the rod 36 is made. On the middle of the supporting member 39 made of thin leaf spring member, plural through holes 39d', 39d', 39d' and 39e', 39e', 39e' are made. The supporting members 39, 39 have quite weak spring properties, so it facilitates axial move of the rod 36 and gives little resistance against the move of the rod 36. Each disc type filter member 40, as shown in FIG. 3, having reinforcement limbs 40a, 40b, and the area 40c (between 40a and 40b) is formed of a thin membrane having small holes therein to provide semi liquid sealability and air-permiability. The center of the filter member 40 has a through hole 40d to pass the rod 36, and as a whole, the filter member 40 has a quite flexible property.

The assembly of the magnetic section 2 is that; the core 33 with the coil assembly 35 fixed is inserted from one side of the case 32; the flange 33a is located and fixed by a step 32a, then the static section is completed; on the other hand, at an end section 36b on the rod 36, the plunger 37 encloses the section 36b with a stopper 41 which is made of non-magnetic material so that the stopper 41 prevents the core 33 from contacting the end of the concave 37a of the plunger 37; outside of the plunger 37, the through holes 39f and 39d of the disc type supporting member 39 and filter member 40 which are closely overlaid, and a washer 42 are fitted in the section 36b and caulked, then the movable section is completed; the movable section is inserted from one end of the case 32; the limb 40a and the outer ring 39a are positioned and fixed in a dent 32b made at another end of the case 32; a circular holder 43 is set next to the supporting member 39 toward axially outside; the brim of another side of the case 32 is caulked; another end of the rod 36 is supported by the supporting member 39 and the filter member 40; at a small section 36a at one end of the rod 36, the through holes 39f and 40d of the supporting member 39 and the filter member 40 enclose the rod 36; from outside an elastic holder 45 also encloses the rod 36, and is fixed to the rod 36; then another side of the movable section is fixed on the static section.

The flange 31 made at another side of the valve sleeve 5 is inserted in one side of the case 32; the limb 40a of the filter member 40 and the outer ring 39a of the supporting member 39 are held between the flange 31 and the flange 33a of the core 33; and the brim of the case 32 is caulked to the circumference of the flange 31. By doing this the assembly work is completed.

In the case that the filter member 40 and the supporting member 39 are caulked to the case 32 at another end of the magnetic section 3 (right side of FIG. 1), if the case 32 is caulked after inserting a ringed stopper (not shown) at the dent 32b to regulate the move of plunger 37 to another side, setting of initial position of the plunger 37 can be easily and correctly attained when the plunger 37 is under the motion. Accordingly the motion of the magnetic section 3 and precision of modulating property corresponding to input electric level of the pressure control valve 1 are largely enhanced.

The embodiment has the above stated elements, so pressure liquid (for example: oil) is applied to the application port 15 from a pump, etc., the oil is led to the space between the lands 19 and 17 through the opening of the valve sleeve 5 and the land 19. Further the oil is applied to each apparatus in a hydraulic system in an automatic transmission, etc. from the output port 13 laid between the lands 17 and 19. The pressure P taken from the output port 13, at the same time, is led to the feedback port 16 through the feedback passage, and led to the space 22 between the lands 19 and 20. Based on difference of the cross section A1 of the land 19, and the cross section A2 of the land 20: (A1−A2), a feedback force P(A1−A2) is developed. Then the force is added to the force Fsol developed from the magnetic section 3: P(A1−A2)+Fsol, this force presses the spool 6 to the left direction. The spool 6 is moved to the point where the above forces, i.e. sum of the magnetic section and the feedback pressure, and the force developed by the spring 7, Fsp which presses the spool 6 to the right direction, are balanced. By the move of the spool 6, the lands 17 and 19 provide the application port 15 and the drain port 12 with certain opening ratios. As a result, the output pressure P at the output port 13 corresponds to the input electric level sent to the magnetic section 3:

$$P = (Fsp - Fsol)/(A1 - A2) \qquad (1)$$

Corresponding to the move of the spool 6, the rod 36 moves axially. At this time as the rod 36 is supported by the disc type supporting members 39, 39 having weak spring property whose resistance is negligible for the move of the rod, the rod 36 moves quite smoothly. Inside of the magnetic section 3 can communicate the outside through the holes 39d' and 39e' of the supporting member 39. However if foreign materials approach to enter the filter member 40 which is overlaid with the supporting member 39, prevents them from entering. Due to the above, a foreign material such as a minute magnetized fraction is prevented from entering into the magnetic section 3. Accordingly magnetic circuit is protected and disturbance is prevented, and further dust and leaked oil are also prevented from entering, so the function of the magnetic section is stable for long time. In addition the disc type supporting members 39, 39 and the disc type filter members 40, 40 move uniformly along by the rod 36, which brings about not only no volume change in the magnetic section 3 but also no pressure change because if temperature change may bring about pressure change such pressure is released from the filter member 40 and the through hole 39d", and 39e', and not applied to the end of the land 20. Consequently one of the causes bringing about decline of precision in pressure modulation is removed.

On the other hand, on the pressure control valve in FIG. 1, the cross section A2 of the land 20 is made larger than the cross section A1 of the land 19, and the spring 7 is given a property weak enough only to contact the spool 6 and the rod 36. And the positions of the application port 15 and the drain port 12 are changed each other, so the following formula is obtained:

$$P = (Fsol - Fsp)/(A2 - A1) \qquad (2)$$

Due to the above modification, the output pressure P is increased according to the increment of the electric level input to the magnetic section 3. And to obtain the same property of the pressure control valve, it is suggested that the land 20 (in FIG. 1) is relocated to the left side of the land 17, and each port is made accordingly on the valve sleeve 5.

The main concept of the present invention is also materialized in the combination of the magnetic section 3 and a diaphragm type pressure control valve, or a relief valve type pressure modulating section instead of that of a reduction valve type and the magnetic section 3.

Effects of the present invention are shown as follows: as the both ends of the rod 36 which moves along by the center of the magnetic section 3 are supported by the both ends of the case 32 through the disc type supporting members 39, 39 made of leaf spring, the rod 36 is able to move under the condition that the rod 36 is suspended in to the case 32, so the response of the move of the rod 36 and precision in pressure modulating property are enhanced. Along by the move of the rod 36, the disc type supporting members 39, 39 move in the same direction as the rod, so no volume change in the magnetic section 3 is brought about, and entering foreign material due to pressure change is prevented. Furthermore, pressure change due to temperature change in the magnetic section is prevented by means of the filter members 40, 40 and through holes 39d" and 39e' of the supporting members 39, 39, so that not only the changes of modulating properties caused by volume change and pressure change are prevented but also response is enhanced. Due to the disc type filter members 40, 40, fewer foreign materials are caught in the magnetic section 3, so the magnetic section 3 and further the pressure control valve 1 can secure stable operation for long time. And as the structure of the magnetic section 3 is quite simple, machining and assembly are performed easily, and accordingly cost is reduced.

We claim:

1. A pressure control valve comprising,
    a pressure modulating valve section including a valve sleeve having a space at one side and a drain communicating the space, and a spool situated inside the valve sleeve, and
    a magnetic section connected to the pressure modulating valve section, said magnetic section including:
    a cylindrical case attached to the valve sleeve at a side of the space,
    a coil assembly concentrically installed in said case,
    a cylindrical core concentrically installed inside said coil assembly,
    a rod slidably situated inside the core,
    a plunger fixed to the rod at a side opposite the space so that when the coil assembly is actuated, the plunger is moved to thereby allow the rod to slide inside the core,
    a disc type supporting members made of leaf spring materials, each supporting member having a central hole, a plurality of through holes, an outer brim and an inner brim along the central hole, said outer brims of the supporting members being fixed to both axial ends of the cylindrical case and said inner brims of the supporting members being connected to the rod to slidably support the same inside the case, and
    disc type filter members overlaid on the disc type supporting members, said filter members having semi liquid sealability and air permeability to prevent pressure change inside the magnetic section.

2. A pressure control valve according to claim 1, wherein said filter members are situated inside the disc type supporting members in the magnetic section.

3. A pressure control valve according to claim 2, wherein each disc type supporting member includes a plurality of first through holes situated inside the outer brim, first connecting parts situated between the adjacent two first through holes, a plurality of second through holes situated between the first through holes and the central hole, and second connecting parts situated between the adjacent two second through holes so that the second connecting parts are arranged between the adjacent two first connecting parts, respectively.

4. A pressure control valve according to claim 3, wherein each disc type filter member includes outer and inner limbs, a portion between the outer and inner limbs having semi liquid sealability and air permeability.

* * * * *